(12) United States Patent
Chavez et al.

(10) Patent No.: US 7,860,739 B1
(45) Date of Patent: Dec. 28, 2010

(54) METHOD AND APPARATUS FOR OPTIMIZING A MULTIVARIATE ALLOCATION OF RESOURCES

(75) Inventors: Thomas A. Chavez, San Francisco, CA (US); Paul Dagum, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 267 days.

(21) Appl. No.: 12/060,252

(22) Filed: Mar. 31, 2008

Related U.S. Application Data

(60) Division of application No. 09/491,461, filed on Jan. 26, 2000, now Pat. No. 7,584,112, which is a continuation-in-part of application No. 09/412,560, filed on Oct. 5, 1999, now Pat. No. 6,684,193.

(51) Int. Cl.
*G06F 9/46* (2006.01)
(52) U.S. Cl. .............................. 705/8; 705/9
(58) Field of Classification Search .................. 705/8, 705/9; 703/2, 6; 700/28
See application file for complete search history.

(56) References Cited

U.S. PATENT DOCUMENTS

| | | | |
|---|---|---|---|
| 4,744,026 A | 5/1988 | Vanderbei | 364/402 |
| 4,744,027 A | 5/1988 | Bayer et al. | 364/402 |
| 4,744,028 A | 5/1988 | Karmarkar | 364/402 |
| 4,894,773 A | 1/1990 | Lagarias | 364/402 |
| 4,914,563 A | 4/1990 | Karmarkar et al. | 364/148 |
| 4,924,386 A | 5/1990 | Freedman et al. | 364/402 |
| 5,111,391 A | 5/1992 | Fields et al. | 364/401 |
| 5,126,936 A | 6/1992 | Champion et al. | 364/408 |
| 5,185,715 A | 2/1993 | Zikan et al. | 364/807 |
| 5,195,026 A | 3/1993 | Nonaka et al. | 364/148 |
| 5,291,394 A | 3/1994 | Chapman | 364/401 |
| 5,406,476 A | 4/1995 | Deziel, Jr. et al. | 364/402 |
| 5,486,995 A | 1/1996 | Krist et al. | 364/149 |
| 5,630,070 A | 5/1997 | Dietrich et al. | 395/208 |
| 5,724,487 A | 3/1998 | Streit | 395/24 |
| 5,729,700 A | 3/1998 | Melnikoff | 395/236 |
| 5,732,400 A | 3/1998 | Mandler et al. | 705/26 |
| 5,784,696 A | 7/1998 | Melnikoff | 705/36 |
| 5,797,127 A | 8/1998 | Walker et al. | 705/5 |
| 5,812,987 A | 9/1998 | Luskin et al. | 705/36 |
| 5,812,988 A | 9/1998 | Sandretto | 705/36 |
| 5,884,287 A | 3/1999 | Edesess | 705/36 |
| 5,946,212 A | 8/1999 | Bermon et al. | 364/468.03 |
| 5,970,465 A | 10/1999 | Dietrich et al. | 705/7 |

(Continued)

FOREIGN PATENT DOCUMENTS

DE 0 356 191 A2 2/1999

OTHER PUBLICATIONS

J.H. Cadwell, "The Bivariate Normal Integral," Biometrika, vol. 38, 1951, pp. 475-479.

(Continued)

*Primary Examiner*—Johnna Loftis
(74) *Attorney, Agent, or Firm*—Perkins Coie LLP

(57) ABSTRACT

A method provides for an efficient unconstrained and nonlinear constrained optimization solution to a multivariate allocation of resources to meet manufacturing needs for uncertain multiproduct demand, where uncertainty is captured through a multivariate normal distribution over product demand (or more generally, through a member of the elliptical family of distributions).

15 Claims, 12 Drawing Sheets

U.S. PATENT DOCUMENTS

| | | | | |
|---|---|---|---|---|
| 5,970,479 | A | 10/1999 | Shepherd | 705/37 |
| 5,991,743 | A | 11/1999 | Irving et al. | 705/36 |
| 6,003,018 | A | 12/1999 | Michaud et al. | 705/36 |
| 6,006,192 | A | 12/1999 | Cheng et al. | 705/7 |
| 6,021,397 | A | 2/2000 | Jones et al. | 705/36 |
| 6,032,123 | A | 2/2000 | Jameson | 705/8 |
| 6,035,277 | A | 3/2000 | Anbil et al. | 705/8 |
| 6,038,540 | A | 3/2000 | Krist et al. | 705/8 |
| 6,088,676 | A | 7/2000 | White, Jr. | 705/1 |
| 6,138,103 | A | 10/2000 | Cheng et al. | 705/7 |
| 6,308,162 | B1 | 10/2001 | Ouimet et al. | 705/7 |
| 6,374,227 | B1 | 4/2002 | Ye | 705/8 |
| 6,684,193 | B1 | 1/2004 | Chavez et al. | 705/8 |
| 6,826,538 | B1 | 11/2004 | Kalyan et al. | 705/7 |
| 6,965,867 | B1 | 11/2005 | Jameson | 705/8 |

OTHER PUBLICATIONS

F.N. David, "A Note on the Evaluation of the Multivariate Normal Integral," Biometrika, vol. 40, 1953, pp. 458-459.

J.A. Nelder, and R. Mead, "A simplex method for function minimization," Computer J., vol. 7, 1965, pp. 308-313.

S. John, "On the Evaluation of Probabilities of Convex Polyhedra Under Multivariate Normal and t Distributions," Journal of the Royal Statistical Society, Series B, vol. 28, 1966, pp. 366-369.

Frank M. Bass, "A New Product Growth for Model Consumer Durables," Management Science, vol. 15, No. 5, Jan. 1969, pp. 216-227.

Camilo Dagum, "Structural Permanence: Its Role in the Analysis of Structural Dualisms and Dependences and for Prediction and Decision Purposes," The Economics of Structural Change vol. 1, Harald Hagemann et al., eds., Edward Elgar Publishing, 1969, pp. 211-235.

D.F. Shanno, "Conditioning of Quasi-Newton Methods for Function Minimization," Mathematics of Computing, vol. 24, 1970, pp. 647-656.

Roy C. Milton, "Computer Evaluation of the Multivariate Normal Integral," Technometrics, vol. 14, 1972, pp. 881-889.

M. J. D. Powell, "The Convergence of Variable Metric Methods for Nonlinearly Constrained Optimization Calculations," Nonlinear Programming 3, (O.L. Mangasarian et al., eds.), Academic Press, 1978, pp. 27-63.

M.J.D. Powell, "A Fast Algorithm for Nonlinearly Constrained Optimization Calculations," Numerical Analysis, G. A. Watson ed., Lecture Notes in Mathematics, Springer Berlin, vol. 630, 1978, pp. 144-157.

Bernard Harris and Andrew P. Soms, "The Use of the Tetrachoric Series for Evaluating Multivariate Normal Probabilities," J. Multivariate Anal., vol. 10, 1980, pp. 252-267.

IBM, "Inversion of Large, Symmetric, Positive Definite, NonSparse Matrices," IBM Technical Disclosure, Mar. 1980, vol. 22, Iss. 10, 5 pages.

Ted Dintersmith, "A Separating Choice Hyperplane Algorithm for Evaluating Multiattribute Decisions," Operations Research, Nov./Dec. 1984, vol. 32, No. 6, p. 1328, 1 page.

K. Schittowski, "NLQPL: A Fortran-Subroutine Solving Constrained Nonlinear Programming Problems," Annals of Operations Research, vol. 5, 1985, pp. 485-500.

Dagum et al., "Polytopes, Permanents, and Graphs with Large Factors," IEEE, 1988, 1 page.

Edirisinghe, Nalin Chanaka Perera, "Essays on Bounding Stochastic Programming Problems," Dissertation Abstract Internation, 1991, vol. 53/12-B, p. 6379, 1 page.

Vijay Mahajan, Eitan Muller, and Frank M. Bass, "New-Product Diffusion Models," Chapter 8, Handbooks in OR & MS, vol. 5, J. Eliashberg and G.L. Lilien, eds., Elsevier Science Pubs., B.V., 1993, pp. 349-408.

Dominique M. Hanssens and J. Parsons Leonard, "Econometric and Time-Series Market Response Models," Chapter 9, Handbooks in OR & MS, vol. 5, J. Eliashberg and G.L. Lilien, eds., Elsevier Science Pubs., B.V., 1993, pp. 409-464.

Guillermo Gallego, and Garrett Van Ryzin, "Optimal Dynamic Pricing of Inventories with Stochastic Demand Over Finite Horizons," Management Science, vol. 40, 1994, pp. 999-1020.

Hillier et al., "Introduction to Operations Research," McGraw-Hill, Inc., 1995, 6$^{th}$ Edition, pp. 26-28, 38-43, 82-90, 134, 153-158, 164-174, 558-562, and 568.

Hillier et al., Introduction to Operations Research, 1995, McGraw-Hill, Inc., 6$^{th}$ Edition, pp. 8-22, 26-28, 558-579, and 606-607.

Hillier et al., "Introduction to Operations Research," McGraw-Hill, 1995, 6$^{th}$ Edition, pp. 558-563, 568-572, 591-8, 606-7, 900-2, 909-925, 932-3.

Dagum et al., "Time Series Prediction Using Belief Network Models," International Journal of Human-Computer Studies, Jun. 1995, vol. 42, 1 page.

Alanyali, Murat, "Analysis of Some Simple Policies for Dynamic Resource Allocation," Dissertation Abstracts International, 1996, vol. 57/10-B, 1 page.

Guillermo Gallego, and Garrett Van Ryzin, "A Multiproduct Dynamic Pricing Problem and Its Application to Network Yield Management," Operations Research, vol. 45, 1997, pp. 24-41.

Benjamin Van Roy, "Learning and Value Function Approximation in Complex Decision Processes," Dissertation Abstracts International, 1998, vol. 59/10-B, p. 1-2.

Manugistics, Inc., "Statgraphics Plus," www.statgraphics.com, Dec. 1998, 13 pages.

Warren H. Hausman et al., "Joint demand fulfillment probability in a multi-item inventory system with independent order-up-to policies," European Journal of Operational Research, vol. 109 (1998), pp. 646-659.

METHOD AND APPARATUS FOR OPTIMIZING A MULTIVARIATE ALLOCATION OF RESOURCES

REFERENCE TO RELATED APPLICATIONS

This application is a divisional of U.S. patent application Ser. No. 09/491,461, now U.S. Pat. No. 7,584,112 issued Sep. 1, 2009, entitled "Method and Apparatus for Optimizing a Multivariate Allocation of Resources," filed Jan. 26, 2000, and naming Paul Dagum and Thomas A. Chavez as inventors, which in turn is a continuation-in-part of U.S. patent application Ser. No. 09/412,560 filed Oct. 5, 1999, now U.S. Pat. No. 6,684,193 issued Jan. 27, 2004, and entitled "Method and Apparatus for Optimizing a Multivariate Allocation of Resources" (the "'560 application"). These applications are hereby incorporated by reference herein in their entireties.

FIELD OF THE INVENTION

The present invention relates generally to a method for optimizing a multivariate allocation of resources. In particular, various implementations of the invention may be usable to provide a method for finding an optimum level of resources that will support a desired level of production of refinements being produced from those resources. Conversely, various implementations may also allow for finding a level of resources that will support an optimum level of production refinements produced from the resources.

BACKGROUND

In the production of products, or refinements, certain sets of resources are used to create each such product. Each refinement might use one or more resources to facilitate its production. Additionally, such resources might be shared as common components that are used to form a plurality of different refinements. In order to produce the desired level of different refinements, it is necessary to maintain a sufficient supply of resources on hand that will satisfy the general need, in light of the complex interactions between the various refinements and resources.

The desired levels of refinements are usually derived from trying to maximize the amount of revenue that can be derived from selling the refinements. Hence the price to be charged for each refinement would be one important factor in determining optimum levels of production for each refinement. In the simplest case, an infinitely large supply of resources would be maintained, so that any desired levels of refinements could be produced without delay.

Other considerations, however, do not make this solution practical. Profits for each refinement must be considered, and profits are a factor of the price required to obtain each component part that goes to make up the refinement. Resources that are maintained as inventory often carry a high price. Such resources lose their relative value over time (also referred to as "erosion"), due to aging of the parts, technology advancements, and the like. Storage costs of inventory are also a factor to be considered. Hence, maintaining a large inventory would guarantee continuous production of the refinements, but would lead to higher production costs.

The converse to this situation would be to maintain very small inventories of resources. This presents a problem, however, when the production process demands more resources than are available in the present inventory. New component parts must be ordered from supplier in order to fill the need. If the need is immediate (as it often is), certain parts may not be available at all, due to the limited production capabilities of the supplier. Otherwise, even if the parts are available, a higher price will generally be charged to expedite the shipment of such component parts. Hence, maintaining a low inventory is not a realistic solution, as production might be halted altogether, or production costs would escalate due to the added cost for expedited component resources.

This complex set of interactions results in an associated multivariate normal distribution of demand and an associated Expected Value Function (EVF) of a set (or vector) of refinements, as a function of a given set (or vector) of resources. Each modeled "plan" or interaction of refinements and resources will produce different EVFs, which are a function of many different elements, and connect rates between the elements. In general this function has been very difficult to solve and requires significant computer resources, and/or time to solve. Additionally, the non-deterministic nature of the function leads only to approximate results, and not full solutions.

A method and apparatus have been provided in the '560 application (as incorporated herein) to provide a deterministic solution to the EVF. The modeling technique described properly accounts for the horizontal and vertical interactions between certain modeled elements. The solution technique provides a closed form expression of the resulting function, wherein it will not be necessary to solve multidimensional integrals in order to determine a solution. This closed form (deterministic) expression should also be executable on ordinary computer resources, and in a reasonable period of time, despite the multivariate nature of the problem.

Even with the closed form expression provided by the '560 application, and the relative ease of its solution over prior forms, it is desirable to optimize the expression in order to determine an adequate (but not overabundant) supply of resources to provide a desired level of refinements. Any number of optimization techniques might be employed. Certain prior optimization techniques are search-based, and iteratively determine a solution for the expression by comparing each new determined result with the last. Such solutions scale exponentially as the complexity of the problem (or plan) increases, and become computationally intractable for even modest sized real-world applications. Additionally, such solutions are not guaranteed to find a global maximum, and instead the search might end up converging on a local maximum instead.

Current techniques or methods used for optimization can be generally divided into unconstrained optimization and constrained optimization. In unconstrained optimization, methods are broadly categorized on whether they use derivative information or do not use such information. Methods that do not use derivative information are search methods used for problems that are very nonlinear or have discontinuities. When the function to be optimized is continuous, gradient methods generally work best. Newton's method is an example of a higher order method that uses second order information. All such methods are computationally expensive, especially as the order increases, and as the dimensionality of the problems increases. With regards to the latter, the increase in computational complexity grows exponentially with the number of dimensions. Such methods are therefore prohibitive for any real world resource allocation optimization problem.

Constrained optimization aims at solving the Kuhn-Tucker (KT) equations that are necessary conditions for optimality for a constrained optimization problem. State of the art methods include constrained quasi-Newton methods, which are commonly referred to as Sequential Quadratic Programming (SQP) methods. These methods can at most achieve the efficiency of unconstrained optimization, and in general are less efficient.

Accordingly, what is needed in the field is an optimization technique that simplifies the optimization solution of the closed form expression to still another deterministic value, and a solution that scales efficiently with the size of the problem. The solution should work for unconstrained as well as nonlinear constrained optimizations. The solution must account for the dependencies and interactions between the various elements (i.e., refinements and resources). The solution must also provide a reasonable time to termination, and one that does not grow exponentially in its complexity as the order of the plan increases. The solution should arrive at a global maximum for the value function, and not get caught finding local maxima. For an "N" dimensional problem, the deterministic solution might provide for maximizing N one-dimensional expressions (over one variable each), instead of maximizing one N-dimensional expression (over many variables).

SUMMARY

A method is disclosed that provides an efficient optimization solution to a closed form expression that has been derived for the multivariate allocation of resources. In particular, a method is provided for an efficient unconstrained and nonlinear constrained optimization solution to the multivariate allocation of resources to meet manufacturing needs for uncertain multiproduct demand, where uncertainty is captured through a multivariate normal distribution over product demand (or more generally, any member of the elliptical family of distributions).

This theory and solution generalizes to any model of resource consumption, in relation to producing a "refinement." The term "refinement," as used through this document, is generally intended to represent an end result (i.e., product) which might be produced from a set of resources (i.e., components, or the like). Therefore, a typical refinement-resource framework might involve product-component models, wherein certain components are used to comprise certain products. Resources might also include available liquid capital for investment, bonds, stocks, and options. The present system might also be used to consider assets, a portfolio of assets, or consumption of those assets, such as energy (e.g., gas, nuclear, electric), space, real estate, etc. Another example problem includes the allocation of manpower. For instance, in association with manpower problems, a set of resources (i.e., employees) exists that might be used by many different end sources (i.e., work tasks, or jobs). Sharing of such manpower will involve a complex mix of parameters. In order to maximize productivity (or revenue), the assets (or resources) will need to be analyzed, in relation to production (or refinement) goals. Optimization of the resulting function representing the models should be performed in order to provide the proper amount of resources to produce a desired level of refinements. Additionally, the space of allowable resources may be constrained through nonlinear inequalities, requiring that the solution to the optimization satisfy those inequalities.

As yet another example, a company might entertain a portfolio of development projects. Each project requires the allocation of capital, work force, and new equipment. Certain factors remain uncertain, including project growth as based upon the success of the venture, market indicators of the interest in the product, uncertain market pressures and demand, and the synergization and cannibalization offered by competing projects. In this instance, the company might desire to know how to best allocate its resources over the various projects in order to maximize revenues in the face of the aforementioned uncertainties.

According to various teachings of the '560 application, and equally applicable to the present application, relevant models and associated equations are formulated according to a "plan", wherein the resulting equations are solved for certain values (or ranges). The models or plans might consist of a set of resources (e.g., components) and a set of refinements of those resources (e.g., products). The resource consumption is based on a linear relationship between each refinement and its set of supporting resources (e.g., the bill of materials for a product). Each resource is typically shared among several refinements. There is a demand distribution for the refinements that can be a multivariate normal distribution (e.g., future product demand for next quarter, or the like). More generally, this distribution can be any member of the elliptical family of distributions, of which the multivariate normal distribution is an example. The following discussion will reference and work with the example multivariate normal distribution, but the present method is not intended to be limited only to such distributions.

There is also a value function that is a linear, polynomial, or exponential function of the refinement demands and other associated parameters of the model. For instance, the value function might include a revenue function for certain products, and might be expressed as a sum of the products of the margin and demand for each refinement (or product). Of interest to any company, analyst, or the like, is the computation of the statistical expectation of the value function at a given resource allocation, and for a given multivariate normally distributed demand profile. This is referred to as the expected value function. This expected value function can be transformed into a closed form expression according to the '560 application.

The resulting closed form expression can be further processed to provide a deterministic solution for optimization of the closed form expression. The EVF resulting from any modeled plan is transformed to be a series (or sum) of products, which is the closed form expression. This process involves transforming the original product space, referred to as "X" herein, to a different space referred to as "Z" herein. In general, this transforming step involves taking a transformation of the product space to provide the working transformed space wherein the transformation can include any that maps the distribution induced on the resources (or components) by the product demand distribution into a distribution with zero mean and unit variance. One such example transformation includes an inverse Cholesky transform. While the inverse Cholesky transform will be referred to herein for example purposes, the present invention is not intended to be limited to only this transformation. As a result, the linear transformation "Z" is an inverse Cholesky transform of the "X" space. The resulting EVF is a summation of product functions and component functions. The product functions include, for example, revenue and price functions. The component functions account for factors such as erosion, expediting, and/or penalty costs.

In graphical theoretic terms, the transformed X space can be described as a series of Z elements (i.e., $Z_1$ through $Z_N$), with the transformation also accounting for the respective connectivities with the resources or components "d" that are associated with each Z element. The next step involves finding an "Equilibrium Configuration" of this Z space graph. An Equilibrium Configuration provides the minimum amount of resources to produce any given amount of refinements, across the whole plan. To do so, each Z is separated out into a series of "blocks" so that it has its own set of resources or components that are not shared with any other Z. If it is determined that the result is in equilibrium, then a series of formulas will exist for each block, and each set of formulas can be maximized separately. An intermediate function "h" is used to relate the level of refinements (Z) to resources (d), and hence the block formulas can become a function of a single variable. The EVF is the sum of these block formulas, and so a single-variable maximization can be performed on each block. Once the maximums are determined for each block, then inverse transformations can be performed on each Z, and the values of "d" for the each of the resources can be computed. This set of resources d will maximize the original EVF.

To determine the Equilibrium Configuration, an iterative method is employed. The first step is a "Loading step." Each Z is analyzed and a "Gating" component is determined, from among the various components associated with each Z. The Gating component is the lowest allocated level of a component needed to make a particular Z. The aforementioned "h" function is used to account for the connectivity rates between each element Z and its components (i.e., $d_1$-$d_N$). As each Z is loaded by a component, the revenue function is recomputed to find a new maximum. Next, it is determined if the new maximum is gated by any remaining components. If it is gated, then the next Z is loaded and similarly checked for gating. If it is not gated, then the present Z is loaded with the next component, and a maximum is recomputed, and gating is checked. This process iteratively continues until the newly computed maximum is not gated, or until no more components remain in the plan.

The second step is referred to as the "Reload step." A component d might have been loaded onto a Z element (e.g., $Z_2$) and that component may have been determined to be a gating component. However, this component may have already been loaded onto a previous Z element (e.g., $Z_1$). It then becomes necessary to "unload" $d_2$ from $Z_1$. The $Z_1$ block is no longer in equilibrium and a new maximum (i.e., $Z_1^*$) is computed. The process rechecks to see whether $d_2$ gates $Z_1^*$. If no, then the process will iteratively move on and reload the next Z element. If gating occurs, then two possibilities must be addressed: (1) If the next Z element (i.e., $Z_2$) has been reloaded, then $Z_1$ is merged with $Z_2$. Merging produces a subgraph, which will resemble the original configuration involving both $Z_1$ and $Z_2$ and their components. However, $Z_1$ and $Z_2$ are no longer independent, and are functionally related. Hence the new block resulting from the sub-graph is still a function of only one variable, and can be maximized accordingly. (2) If $Z_2$ has not been reloaded, then reload $Z_2$ (i.e., the operation is recursive).

Once these Load and Reload steps are completed, an Equilibrium Configuration will result. Each graphical block will be a function of only a single variable (i.e., $Z_1$, $Z_2$, through $Z_N$). It thereafter proves to be relatively straightforward to maximize each function over its single variable. Once the maximum is found, each component ($d_1$ through $d_m$) can be computed or "backed out" of the values for Z. It is these levels of components that will thereby produce a maximum result for the EVF—the plan having adequate resources d, but without resulting in an overabundance of resources that might experience erosion and the like.

In one implementation, a method is provided for optimizing a multivariate representation of resources which are used in producing a set of products, the resources, products and their respective connectivities being represented in a product space plan, the method comprising: converting an expected value function associated with the resources and products into a closed form expression; transforming the product space plan into a working transformed space plan, wherein the products are transformed into working elements; performing a loading step to form elemental blocks as a function of a single variable with elements being loaded with resources that gate production of the element; performing a re-loading step to form elemental blocks as a function of a single variable with elements being reloaded with resources that gate production of the element; solving for the maximum of each elemental block over each associated single variable; and determining the optimum level of resources as a function of the solved-for maximums.

In yet another implementation, a method is provided for optimizing a multivariate expected value function which represents a statistical expectation of the value function at a given component allocation and for a given demand distribution, the method comprising: forming a plan in the product space associated with the expected value function which represents the products, components, and connectivities therebetween; transforming the product space plan to form a corresponding working space plan, with products corresponding to elements such that the distribution induced on the resources is transformed into a distribution with zero mean and unit variance; converting the associated expected value function into a closed from expression; performing a loading step which loads each element with components that gate the production of each element; performing a reloading step which reloads components that were unloaded from an element in the loading step; merging elements that are further gated by components that were unloaded, with the loading, reloading, and merging steps resulting in an equilibrium configuration; and solving, the equilibrium configuration to determine the optimization of the expected value function.

In still another implementation, a method is provided for optimizing the multivariate amount of refinements produced from a level of resources, the method comprising: configuring the refinements and resources in a representative refinement space plan that accounts for connectivities therebetween; deriving an expected value function for the refinement space plan; converting the expected value function to a closed form expression; transforming the refinement space plan into a working space plan, with the refinements represented by transformed elements; sequentially loading each element with resources that gate the production of each element; sequentially reloading components that were unloaded from elements in the loading step; merging elements that are further gated by components that were unloaded, with the loading, reloading, and merging steps resulting in an equilibrium configuration; and solving the equilibrium configuration to determine the optimization of the expected value function.

BRIEF DESCRIPTION OF THE DRAWINGS

The invention, together with further advantages thereof, may best be understood by reference to the following description taken in conjunction with the accompanying drawings in which.

DETAILED DESCRIPTION

The following discussion includes a method for optimizing the multivariate allocation of resources. In one implementation, the method takes a multivariate expected value function as a closed form expression, and optimizing the expression in a deterministic manner. Also described is a method for finding an optimum level of resources that will support a desired level of production of refinements being produced from those resources. Conversely, various techniques also allow allows for finding a level of resources that will support an optimum level of production refinements produced from the resources. The method provides for an efficient unconstrained and non-linear constrained optimization solution to the multivariate allocation of resources to meet manufacturing needs for uncertain multiproduct demand, where uncertainty is captured through a multivariate normal distribution over product demand (or more generally, any member of the elliptical family of distributions).

Example System to be Optimized

Figure 1:
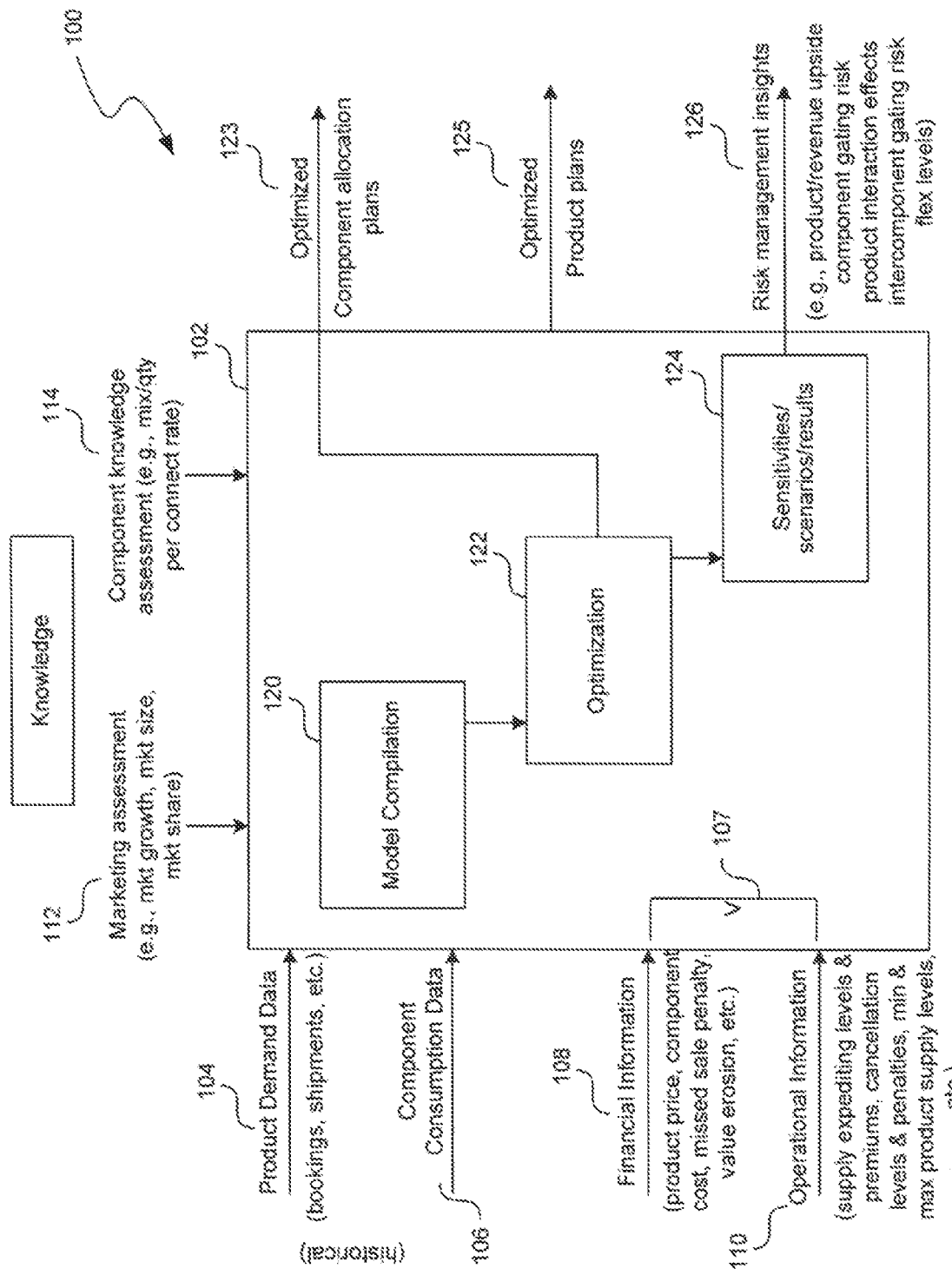
FIG. 1 shows an example system configuration that might utilize the optimization method described herein.

FIG. 1 shows a block diagram 100 with a main element 102 with data (or information) going in, and resulting information coming out. The aggregation and treatment of such data is further detailed below. Examples of historical data flowing into the system include Product Demand Data 104, which would include bookings, shipments, etc. Historical data might also include Component Consumption Data 106.

Value information (or "V" 107) might be represented as financial or operational information. Financial information 108 would include such things as product price, component costs, missed sale penalties, value erosion, etc. A missed sale penalty is derived from every unit of product demand that is left unfulfilled. Value erosion is derived from every product that is built, but goes unsold, with its value eroding over time.

Operational information 110 might include supply expediting levels and premiums, cancellation levels and penalties, minimum and maximum product supply levels, etc. In general, there are significant costs involved with expediting the supply of a component part, particularly in times of shortage. These costs often come in the form of a penalty step function. For the example, procuring up to 100 units might carry a premium of $2 per unit. Procuring 100 to 300 units might carry a premium of $4 per unit, as so forth. As more of a part is needed above a particular contract level, the greater the premium mat will be paid by the manufacturer in trying to procure that part. As more of a part is needed, different trigger points will carry escalating dollar premiums. Cancellation levels and penalties relate generally to fees paid by a company for ordering certain products (or parts), and then canceling the order at a later time. The supplying company will have incurred tooling costs and the like, which must be covered in fees and penalties. Minimum and maximum product supply levels relate to supply levels being used as an operational business parameter. For instance, if a product has been deemed strategically valuable to business channels, then a minimum level might be maintained, regardless of what other financial indicators might suggest regarding the cost of maintaining such minimum levels. A distribution warehouse might carry a certain amount of a product, just in case an important customer might want to purchase a large amount of that product. The detriment of having the product as eroding inventory is outweighed by benefit of having it readily on hand for this important customer. A maximum level might be maintained in order to move customers onward to a next generation product. For instance, even if demand continues to exist for a product, the amount of inventory is fixed at a certain level. After the inventories run out, and customers want more of the product, they are instead encouraged to buy the next model in lieu of the now extinguished product.

The system shown will also incorporate knowledge, data, and the like. Such data might include marketing assessment information 112. Marketing assessment information might include market growth, market size, market share, etc. Knowledge data also includes component knowledge assessment information 114, wherein an example factor such as a mix (or quantity) per connect rate is shown. The connect rate measures the rate at which a component is "consumed" or "demanded" by a product platform. The connect rate can also be estimated from data.

The main body of the system 102 shows certain representative elemental steps that utilize the various data being brought into the system. A model compilation step 120 is shown that compiles the data into a workable form so that working solutions can thereafter be derived from the modeled data. The model compilation leads into an optimization step 122. One solution might be to optimize a certain modeled component of the data, such as an expected value function representing a multivariate function. A resulting output of the system might therefore be optimized component allocation plans 123. Another related output might be optimized product plans 125. The optimization step leads into the element identified as sensitivities/scenarios/results 124. This element produces results such as risk management insights, and the like. Risk management insights 126 include such factors as product/revenue upside, component gating risk, product interaction effects, intercomponent gating risk, and flex levels. Product/revenue upside considers how such factors increase (or affect) overall revenues. Gating risks consider the effects of allocating components towards one product versus another. Interaction effects consider the influence of one product over another (in competing for resources, sales, and the like).

Optimization

Figure 2:
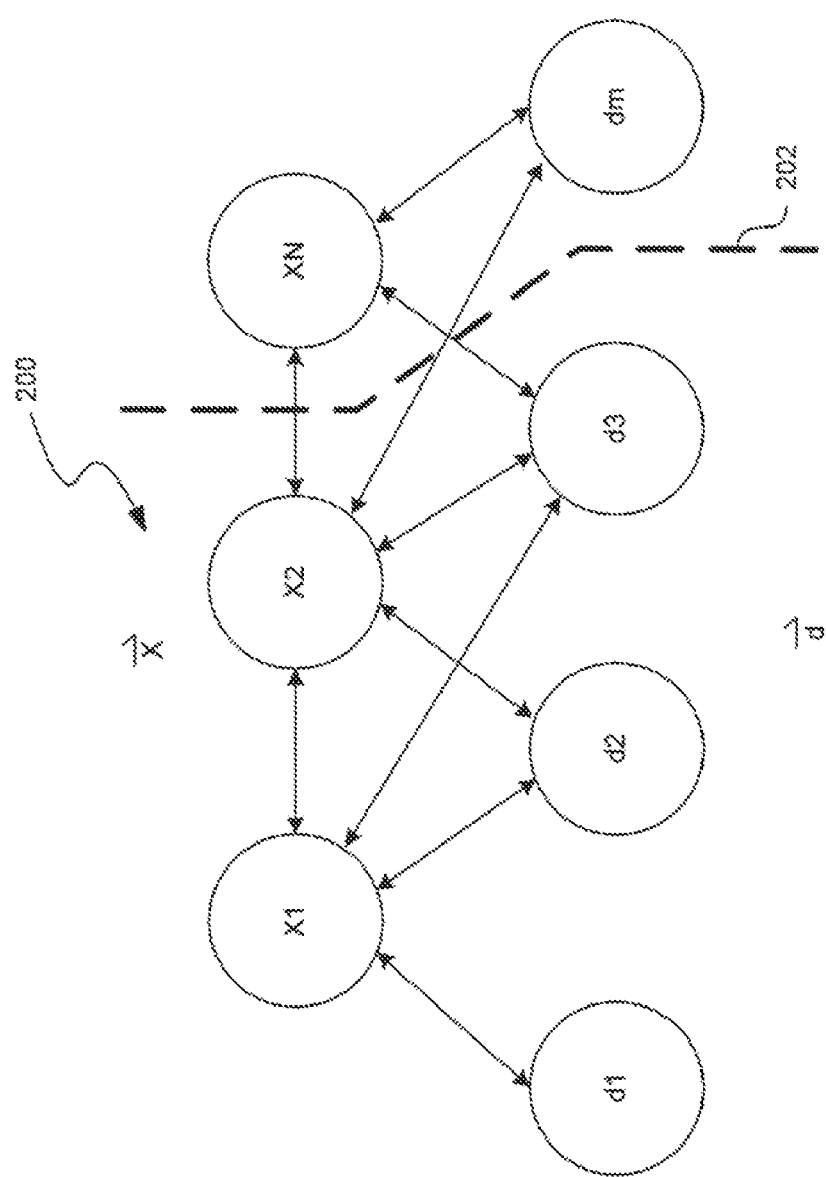
FIG. 2 shows a multi-element influence diagram with multiple horizontal and vertical interactions between the elements.

The optimization step 122 optimizes, or finds a maximum of, the EVF. Referring now to FIG. 2, this complex structure or plan 200 (also referred to as an influence diagram) will have a non-linear, multivariate normal distribution function (i.e., EVF) associated with it. This multivariate normal distribution function represents the multivariate allocation of resources to meet manufacturing needs for uncertain multiproduct demand, where uncertainty is captured through a multivariate normal distribution over product demand. More generally, the distribution might include any member of the elliptical family of distributions. The present method thereby provides for an efficient unconstrained and nonlinear constrained optimization solution to the multivariate allocation.

The products ($X_1$-$X_N$) are shown interacting with components or resources ($d_1$-$d_m$). In higher dimensions, these variables will be referred to in vector notation, i.e., $X_1$-$X_N$ are collectively referred to as vector X, and $d_1$-$d_m$ are collectively referred to as vector d. The dashed line 202 indicates that the limited number elements shown are for example purposes only, and for simplicity in illustrating the proposed solution method. Any number of elements might exist between $X_2$ and $X_N$ with an even larger potential of associated resources interacting (via different connect rates) with such elements.

The resulting EVF might typically represent a revenue generation function, or the like. It then becomes desirable to find the optimum level of production of the products $X_1$ through $X_N$, which will thereby optimize (or maximize) this revenue. One factor to consider is that certain products might not sell for as much as others. Still other products might use more expensive (or more numerous) components or resources (i.e., $d_1$ through $d_m$). The resources further drive (or influence) which levels of X to produce in order to maximize revenue. For instance, certain resources carry higher erosion and/or penalty costs. When all influences are considered, a certain set of resources can be found that will maximize the revenue for the particular plan. By maintaining this level of resources, the desired levels of X can always be produced to thereby maximize the revenue for this plan.

Figure 3A:
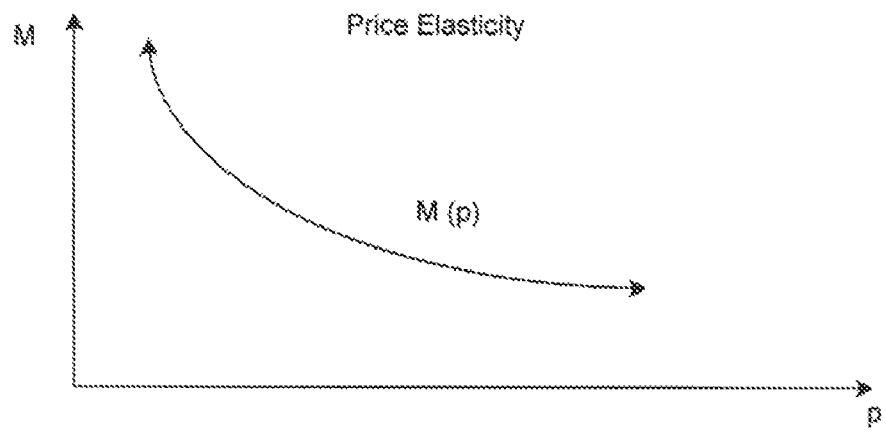
FIG. 3A shows a typical price elasticity curve of the mean μ versus price p.

The plan can also be optimized from a different sense, for instance, over the mean μ. In such a case, the plan is fixed at a level of d, and the value function is considered as a function of the mean μ. With such a formulation, it might therefore be desirable to find a mean demand for which the value function achieves a maximum. One reason for such interest in the mean demand is shown by the following example. In certain situations, a vendor might have on hand products (refinements) that need to be sold, for instance used cars, or the like. The vendor already owns the products and wants to be able to control the mean via the price that is set for the cars. The question then becomes how to price the cars so that they do not sit around in the lot as unsold inventory. Conversely, the vendor does not want to undersell the cars below their actual value. Price elasticity principles (in general) dictate that as the price of an item increases, the demand for that item decreases (and vice versa). For instance, referring to FIG. 3A, a representative curve is shown whereby the mean demand of sales μ(p) is shown as a function of price. It is therefore possible to control this mean demand by adjusting the price. This in turn controls the mean distribution. With the resources d fixed, the mean distribution can in turn used to maximize (or control) the revenue.

Accordingly, these are but a few examples of the types of optimization problems that can be addressed. Such problems might also be applied in either direction. For instance, certain markets might need optimization over plan allocation in order to keep inventories at the right levels to maximize revenues. Still other markets might need optimization over the mean, or finding the price that maximizes sales. The present invention is not intended to be limited to these examples presented, and optimizations over other variables are equally and readily applicable.

The EVF might therefore be a function of (at least) vector $X(\vec{x})$ and vector $\mu(\vec{\mu})$ as shown by the following:

$$\text{Expected Value Funtion} = EV(\vec{x}, \vec{\mu}) \quad (1)$$

Figure 3B:
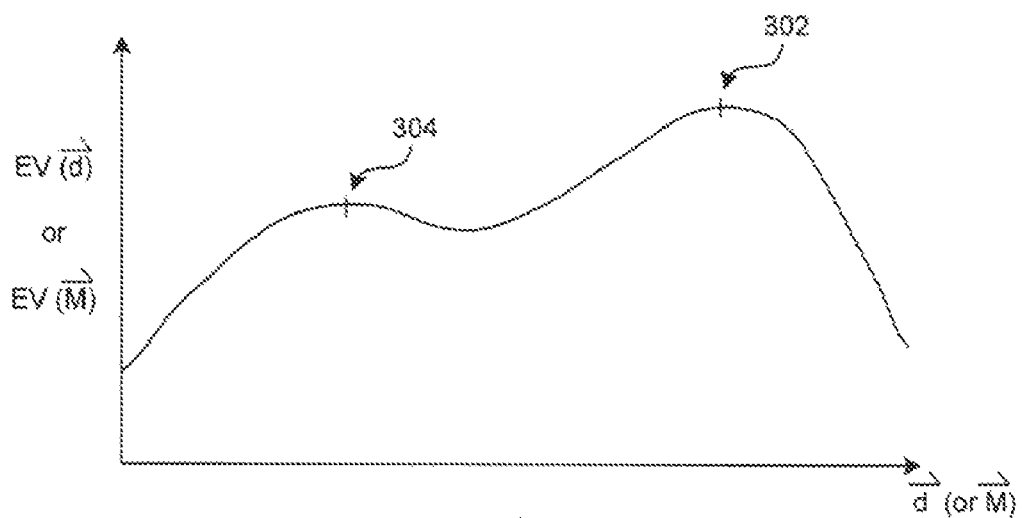
FIG. 3B shows a typical Expected Value function to be maximized, over a component vector d, or mean vector μ.

FIG. 3B shows an example EV plot as a function of vector $d(\vec{d})$. Similarly, this plot might also represent the EV as a function of vector μ, if for instance vector d where fixed. Depending upon the complexity of the relationships between the products X, the EVF might grow linearly, or exponentially with the addition of new products into the plan. For two products $X_1$ and $X_2$, a simple functional relationship might be:

$$f(x_1, x_2) = x_1 + x_2 \quad (2)$$

A more complex functional relationship might include:

$$f(x_1, x_2) = x_1 \cdot x_2 \quad (3)$$

The '560 application demonstrated a method to transform the EVF into a series (or sum) of products, wherein the EVF could readily be solved. However, to optimize this function, search based algorithms are typically employed. For the simple functional relationship above, $X_1$ and $X_2$ would be each be maximized by solving for these variables, then proceeding along the steepest gradient of the functional curve until a maximum is located.

The more complex functional relationship presents a more difficult solution. As each of the terms $X_1$ and $X_2$ are multiplied times each other, one variable $X_1$ would need to be fixed while the other was varied to find a maximum. This process would be iteratively repeated, and grows even more cumbersome as more variables X are added (i.e., the dimension increases). For instance, a function with three variables $X_1$ times $X_2$ times $X_3$ would involve iteratively fixing two of the variables, and solving for a maximum based on varying the third. The problem grows exponentially. For instance, if the number of variables increases by a factor of 10, then the problem complexity would increase by 2^10. Invariably such search based algorithms settle upon solutions that are not global maximums, but instead local maximums. Referring again to FIG. 3B, the desired global maximum is at point 302, but search based algorithms often stop at the local maximum 304.

The present system instead takes the closed form expression provided by the '560 application and provides a non-search based, deterministic optimization solution. As more variables are added, the complexity grows as a low-order polynomial, depending upon the size of the problem. For instance if the problem presents "N" of one type of factor, and "M" of another type of factor, then N*M is the size of the problem. The present method also provides a global maximum solution, rather than a local maximum solution.

The initial step in the present optimization solution involves reducing the EVF to a series (or sum) of products as described in the '560 application. This step transforms the problem from the product space (referred to as "X" space) into a workable transformed space (referred to as "Z" space). This transformation is accomplished by essentially taking a transformation of the product space to provide the working transformed space wherein the distribution induced on the resources is transformed into a distribution with zero mean and unit variance. While any such transformation might be used, one such example transformation would include performing an inverse Cholesky transformation of the X space (with μ subtracted, if desired for the optimization solution), shown as follows:

$$\vec{z} = T^{-1}(\vec{x} - \vec{\mu}) \quad (4)$$

The transformed EVF then becomes a sum (or series) of functions, each representing an integral portion of the graphical plan, shown by:

$$EV = \sum_{i=1}^{N} f_i(z_i) - \sum_{j=1}^{M} g_j(d_j) \quad (5)$$

Figure 4:
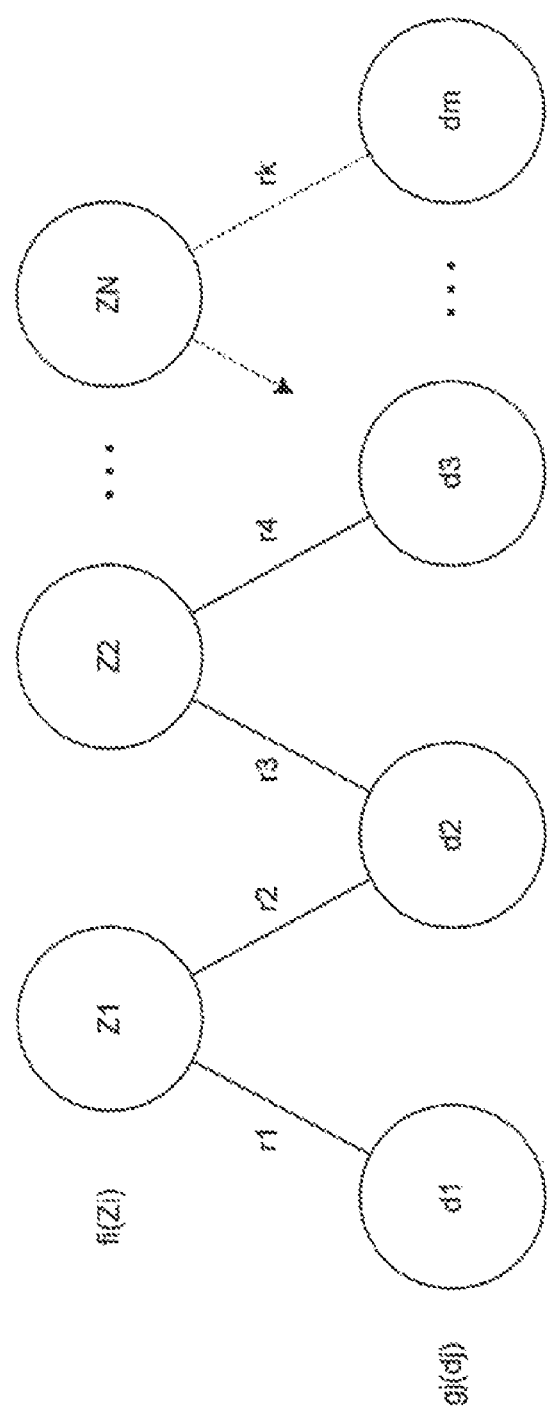
FIG. 4 shows a graphical representation of a plan in the Z space, as transformed from the X space.

The resulting plan is shown by the graph in FIG. 4, which will henceforth be used as a simple example to illustrate the present solution method, in graphical theoretic form. The transformed product space is represented by $Z_1$ through $Z_N$. The component space is represented by $d_1$ through $d_m$. Connectivity rates are also shown between the various elements as $r_1$, $r_2$ though $r_k$.

Figure 5A:
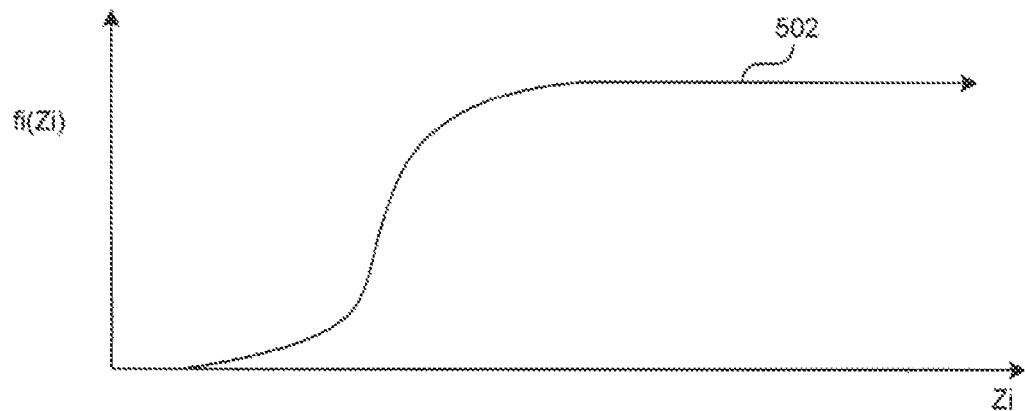
FIG. 5A shows a typical monotonically increasing product function $f_i(Z_i)$.
Figure 5B:
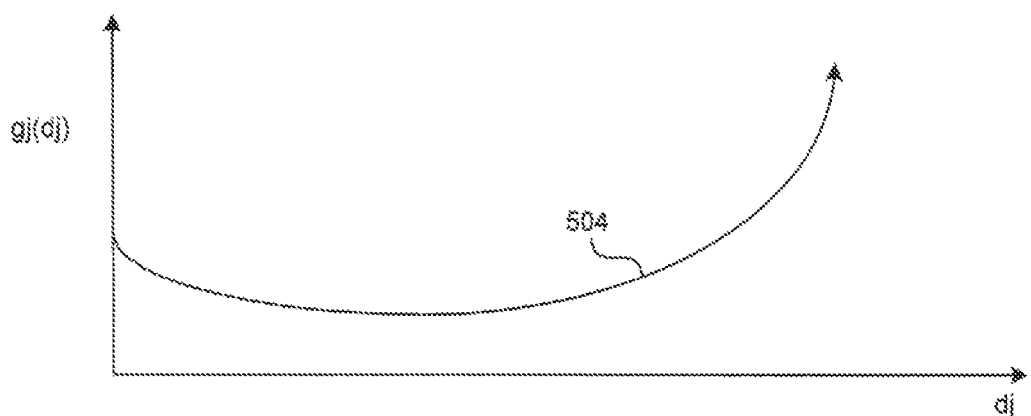
FIG. 5B shows a typical concave component function $g_j(d_j)$.
Figure 5C:
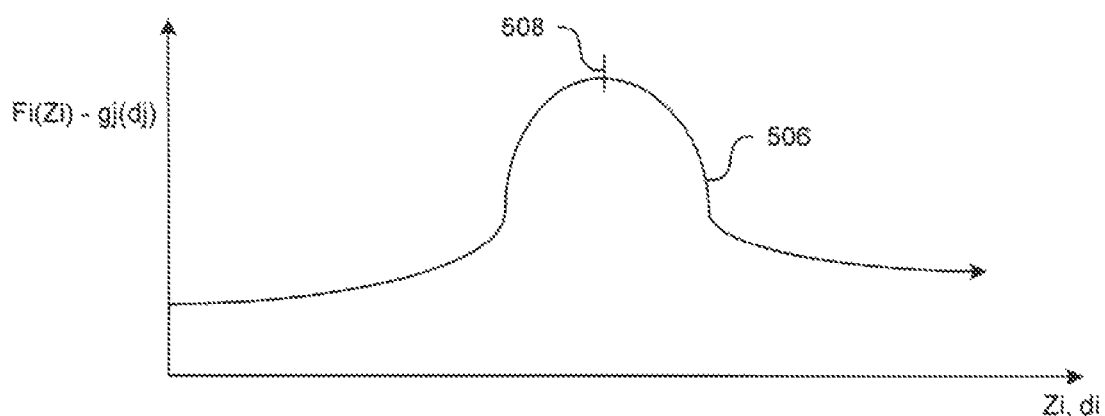
FIG. 5C shows a typical curve resulting from the subtraction of the $g_j(d_j)$ curve from the $f_i(Z_i)$ curve (i.e., $f_i(Z_i)-g_j(d_j)$).

Each function $f_i(Z_i)$ is (for example) a revenue generating function, or the like, with $Z_i$ tied to the product space X. The transformed component functions $g_j(d_j)$ represent erosion type terms, and/or expediting/penalty costs, and are similarly tied to the original component space. Referring now to FIG. 5A, a typical revenue generation function $f_i(Z_i)$ is shown. This curve 502 is monotonically increasing as $Z_i$ increases. Finding a maximum of this curve would simply involve providing as much $Z_i$ as possible to find the highest point (to the right) on the curve. The components d, however, introduce other effects on the revenue. Components in inventory become more expensive, as they decrease in value. Moreover, maintaining smaller numbers of components in inventory introduces potential penalty costs in procuring the components on an expedited basis, i.e., at the last moment they are needed in order to facilitate continue production of products. Accordingly, the component curve $g_j(d_j)$, shown as 504 in FIG. 5B, is generally concave in shape to indicate such effects. The resulting EV curve 506 in FIG. 5C results from subtracting the component cost effects 504 from the revenue curve 502. The maximum of the resulting curve $f_i(Z_i)$-$g_j(d_j)$ is shown at 508. It is this level of $d_j$ that will provide maximum revenues from selling $Z_i$ (or, more accurately, by selling the product $X_i$ relationally tied to the transformed $Z_i$).

The relationship between each $d_j$ and $Z_i$ are tied to the connectivities $r_1$ through $r_k$. A transformation can thereafter be applied, which relates each d and Z element. This is done through a function "h" which relates the connectivities between the elements, generally represented as follows:

$$d_j = h_j(z_k) \quad (6)$$

As such, each $d_j$ can be functionally related to any of the other Z components (i.e., Z, with separate indice k).

Equilibrium Configuration

Given this graphical formulation, it is desired to find an "Equilibrium Configuration" of this graph. In sum, the method takes the overall graph and breaks it up so that each Z has its own set of components, and they are not shared. For any given set of products and components, this Equilibrium Configuration will hold true for the maximum. Once the Equilibrium Configuration is found, the EV formulas for each block can be maximized separately over their given single variable. Hence, instead of maximizing one N-dimensional formula over many different variables, the problem is broken down into maximizing N one-dimensional problems.

Loading Step

Figure 6:
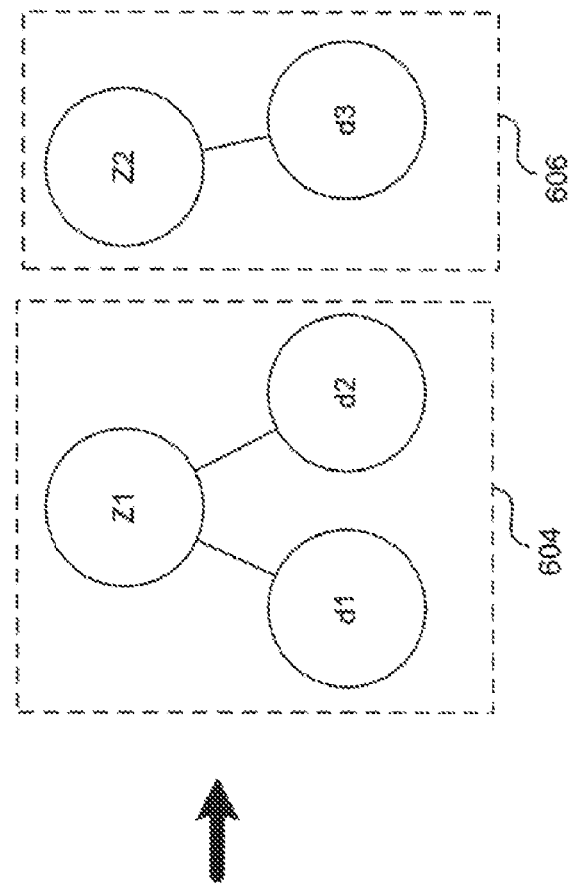
FIG. 6 shows a graphical depiction of a simple plan with the certain aspects of Loading applied to facilitate description of the Loading step.
Figure 6:
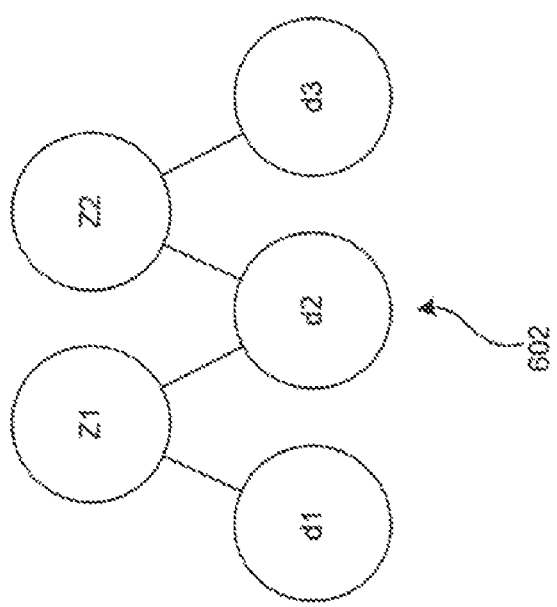
Figure 7:
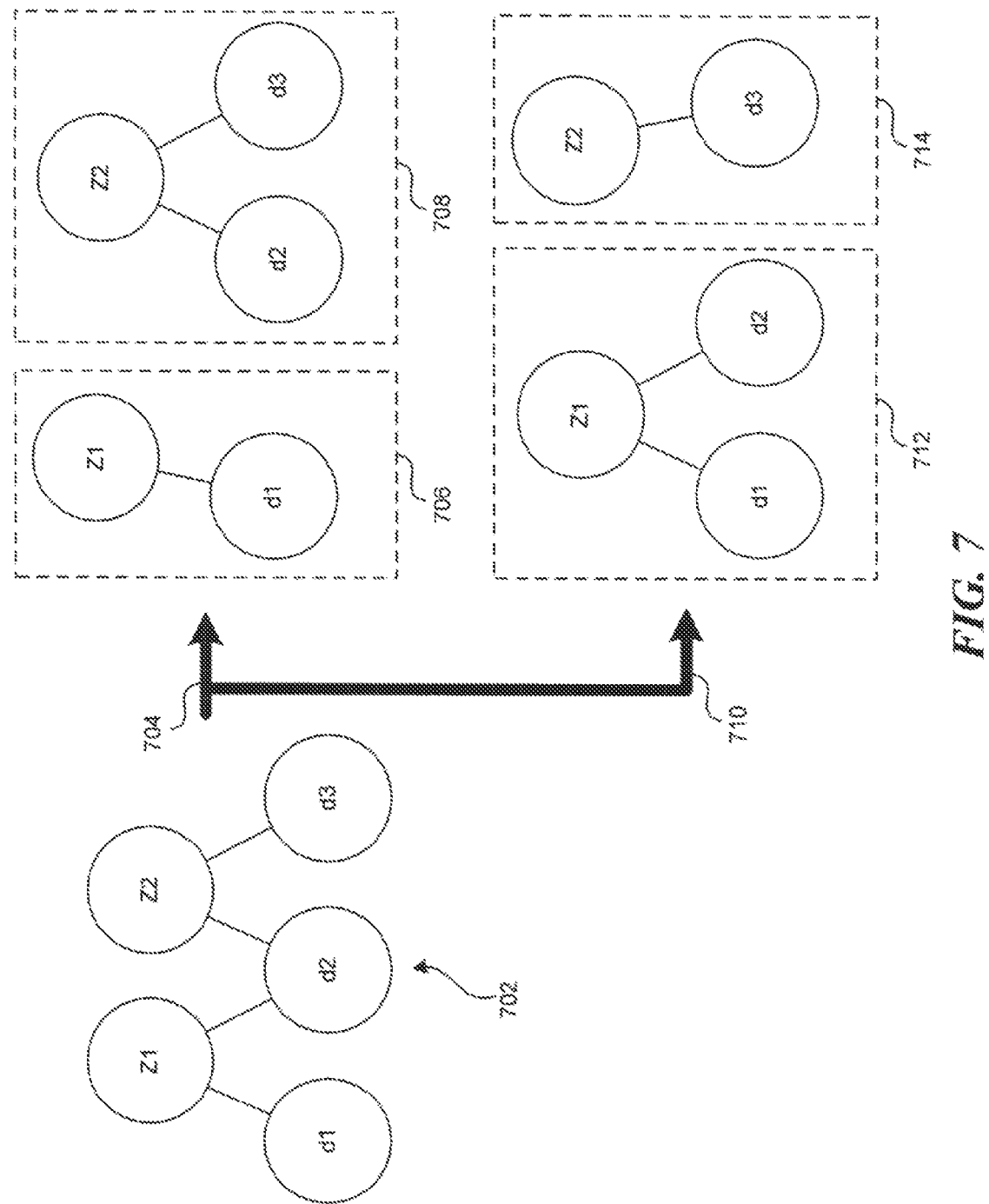
FIG. 7 shows a graphical depiction of a simple plan, with a first and second alternative resulting from the Loading Step, depending upon which components d gate elements Z.

The first step in finding the optimization solution is the "Loading Step." The process of finding the Equilibrium Configuration will be demonstrated in terms of a simple example. Referring to FIG. 6, the Z-space plan 602 is shown comprised of $Z_1$, $Z_2$, and $d_1$, $d_2$, and $d_3$. FIG. 6 will be referred to initially to describe certain theory. FIG. 7 (described below) further describes such theory. Given this simple plan, the elements $Z_1$ and $Z_2$ are separated out into representative blocks, as shown by 604 and 606. Notably the component $d_2$ is shared by both elements $Z_1$ and $Z_2$.

Referring to block 604, it becomes necessary to determine which component "Gates" element $Z_1$. The gating function is determined by the "h" function (see again Eqn. 6), which accounts for the connect rates and interactions between the resources and refinements. In this example, if the connect rates are the same, then a key result operates from the fact that the amount of $d_1$ and $d_2$ that are needed to support $Z_1$ has to be the same. For instance, if $Z_1$ is a computer and needs a keyboard and monitor to build one unit, then at the maximum of $Z_1$, the number of keyboards and monitors has to be the same. If there are more monitors left over than keyboards, then this cannot be a level to support maximum revenues because the surplus of monitors is going to experience erosion (and increase costs).

The key to Gating stems from the fact that each element $Z_1$, $Z_2$, etc. will have a maximum level associated with it, and will require a certain amount of components to support that maximum level. The maximum desired level of $Z_1$ might be found to require one $d_1$ component and ten (10) $d_2$ components. As the present solution progresses, the maximum desired level of $Z_2$ might be found to require only two (2) $d_2$ components. Hence, the component $d_2$ will be found to Gate $Z_1$ as opposed to Gating $Z_2$. In the end, if enough $d_2$ is maintained in inventory to support the higher demand levels of $Z_1$ then the relatively lower demand levels of $Z_2$ will, in turn, be fulfilled by the levels required by $Z_1$. Hence $d_2$ is said to Gate $Z_1$ and not $Z_2$, as reflected in block 604. Block 606 thereby shows the relationship between $Z_2$ and the remaining $d_3$ component.

Once the Gating requirements (or limitations) are fully found for each Z element, then the graphical formulation is found to be in Equilibrium Configuration. Assuming this is the case for the blocks shown as 604 and 606, it then becomes necessary to rewrite the resulting equations to be a function of a single variable. For block 604, the EV function can first be written as:

$$\text{MAX} F_1 = f_1(z_1) - g_1(d_1) - g_2(d_2) \quad (7)$$

which is a function of three variables $Z_1$, $d_1$, and $d_2$. By using the appropriate "h" translation function (see again Eqn. 6) to translate each $d_1$ and $d_2$ into the appropriate variable $Z_1$, the EV function can be rewritten as:

$$\text{MAX} F_1 = f_1(z_1) - g_1(h_1(z_1)) - g_2(h_2(z_1)) \quad (8)$$

Similarly, the second block 606 can first be written as:

$$\text{MAX} F_2 = f_2(z_2) - g_3(d_3) \quad (9)$$

which is a function of two variables $Z_2$ and $d_3$. Again, the appropriate "h" translation function is used to translate $d_3$ into $Z_2$, and the EV function can be rewritten as:

$$\text{MAX} F_2 = f_2(z_2) - g_3(h_3(z_2)) \quad (10)$$

The final EV is the sum of these two functions. Each set of equations for each block can thereby by maximized over a single variable. Once each maximum Z is computed (i.e., $Z_1^*$ and $Z_2^*$), these values can be plugged back into the appropriate "h" translation function to find the levels of components $d_1$, $d_2$, and $d_3$ to support these maximum levels of Z. In other words, the levels of $d_1$, $d_2$ and $d_3$ can be "backed out" of the maximum levels found for $Z_1$.

Accordingly, in proceeding through the Loading step with a full plan of elements, each Z element is analyzed in turn. $Z_1$ is first analyzed to find its gating component, or the lowest allocated level of components needed to make $Z_1$. Referring again to FIG. 6, $Z_1$ uses components $d_1$ and $d_2$. If, for instance, one $d_1$ and one $d_2$ are needed, then the gating component would be either $d_1$ or $d_2$. However, if three of $d_j$ are needed, and one $d_2$ is needed to make one $Z_1$, then the gating component would be $d_1$, as it takes three of $d_j$ for every one $d_2$. The "h" function takes into consideration these rates when relating each d element to each Z element.

Hence, $Z_1$ is loaded with $d_1$. The resulting function is shown by:

$$F_1(z_1) = f_1(z_1) - g_1(d_1) \quad (11)$$

Using this function, the next step is to recompute $Z_1$ that maximizes $F_1$, with the new max being referred to as $Z_1^*$. The next step is to decide whether the new maximum is Gated. In other words, the method checks to see if $Z_1^*$ is further gated by any remaining components, in this case $d_2$. If $Z_1^*$ is not further gated (i.e., NO), then the method moves on to analyze the next element $Z_2$. If $Z_1^*$ is further gated (i.e., YES), then $Z_1$ is loaded with $d_2$ as per the function:

$$F_1 \rightarrow F_1 - g_2(d_2) \quad (12)$$

The function for $Z_1$ is thereafter re-maximized, and the gating is checked again until either "NO" is the result, or no more children (or components) remain for that element Z.

In moving onto the next element $Z_2$, the same process is performed. $Z_2$ is checked to see if it is Gated by its first component, in this case $d_2$. If it is so Gated, then $Z_2$ is loaded by $d_2$, as per the function:

$$f_2(z_2) = f_2(z_2) - g_2(d_2) \quad (13)$$

The maximum for $F_2$ is calculated and at that maximum, it is determined if the component $d_3$ can support that product level. If $d_3$ further Gates $Z_2$, then $d_3$ is loaded onto $Z_2$, as per the function:

$$F_2 \rightarrow F_2 - g_3(d_3) \quad (14)$$

The maximum is recomputed, and the process continues until there are no further components.

The potential blocks resulting from such loading of $Z_1$ and $Z_2$ are further shown in FIG. 7. The original plan is shown as 702. In the first instance 704, the first block 706 resulted from a $Z_1$, which was not gated by $d_2$. Hence block 706 has $Z_1$ loaded only with $d_1$. The second block shows $Z_2$ loaded with the remaining components $d_2$ and $d_3$. In the second instance 710, it was found that $Z_1$ was gated by both $d_1$ and $d_2$, and hence both were loaded accordingly in block 712. The remaining element $Z_2$ was loaded with element $d_3$ in block 714.

One key to the following formulation is Unloading of components. For instance, if $d_2$ gets loaded onto $Z_2$, but $d_2$ was already loaded onto $Z_1$ then the method needs to Unload $d_2$ from $Z_1$. In the first step, it is only desired to have one or the other of $d_1$ or $d_2$ to support the product level $Z_2$. If the revenue generating potential of this "product" (i.e., as relating back to product $X_2$) is so strong that it requires a higher level of a particular component, then this product will continue to generate more and more revenue, even as the component result needed moves further right on the $g_j(d_j)$ curve (which moves up, due to erosion and the like, and pulls down the product curve). Accordingly, this product $Z_2$ might serve to raise the level of $d_2$ to higher levels. But as long as enough $d_2$ is provided to support $Z_2$, then the level of $d_2$ will already be taken up to a level which no longer gates $Z_1$. Hence, unloading $d_2$ from $Z_1$ does not present a Gating problem with the solution.

Such unloading is properly accounted for in the transformed space of the following system. The Z-space represents hypothetical (or transformed) product space. For example, assume that in the original space, $X_1$ and $X_2$ each had a one-to-one connect rate with the component $d_2$. If it were desired to sell ten of $X_1$ and ten of $X_2$, then twenty $d_2$ would be needed to produce the necessary products. If in optimizing the product curve, the solution resulted in a maximum for $X_2$ of ten, then the resulting level of $d_2$ needed would also be ten. However, this would not work because ten $d_2$ would not be enough to also support $X_2$. In the transformed space, however, such limitations to the solution are properly accounted for. If the revenue generating potential of $Z_2$ can sustain a level $d_2$ such that $d_2$ will not Gate $Z_1$, then $d_2$ can be unloaded from $Z_1$ and loaded onto $Z_2$. $Z_2$ will thereby support a level of $d_2$ that does not Gate $Z_1$.

Re-Loading Step

At the end of the Loading step, the resulting graphical solutions resemble the desired Equilibrium Configurations. However, further process steps must be applied because the loading step has not allowed for any two components to be shared by two or more products (as reflected in the original plans). A second step is applied, and is referred to as the Re-Load step, wherein the final Equilibrium Configurations are finally derived.

Figure 8:
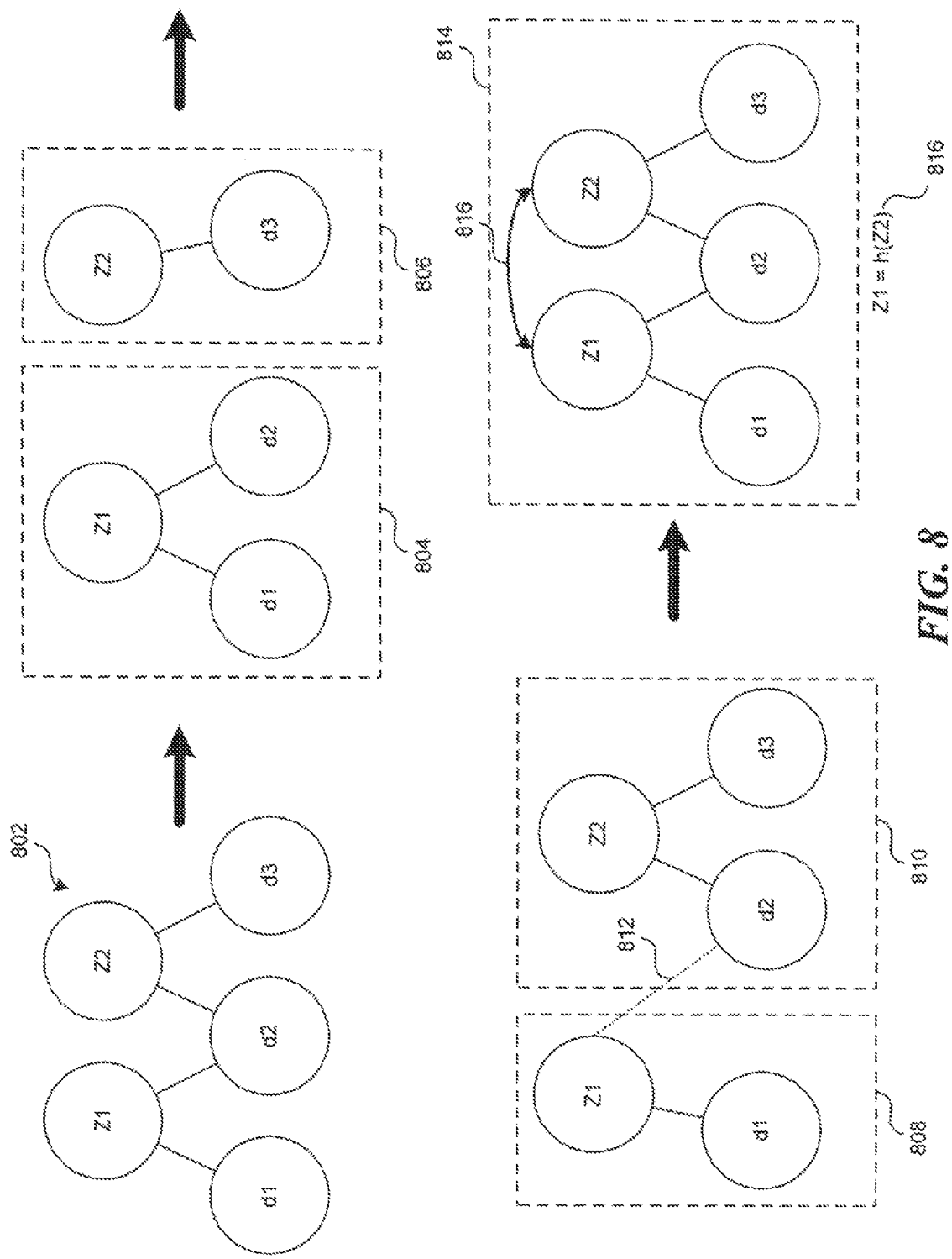
FIG. 8 shows graphical depiction of the simple plan above being guided through the Loading and Re-Loading steps to produce an Equilibrium Configuration, with the result being a Merged block which can be maximized over a single variable Z.

Referring now to FIG. 8, the original plan is again shown as 802. Blocks 804 and 806 are shown resulting from the loading step. In block 804, $Z_1$ is loaded with $d_1$ and $d_2$. Thereafter, $Z_2$ is analyzed and it is decided that its gating component is $d_2$. Accordingly, $d_2$ is unloaded from $Z_1$ and loaded onto $Z_2$. $Z_2$ is further analyzed to see if $d_3$ is a gating component. If $d_3$ is gating the new maximum for $Z_2$ (i.e., $Z_2^*$), then $d_3$ is loaded onto $Z_2$. Blocks 808 and 810 illustrates this effect, as the dashed line 812 shows component $d_2$ being reloaded from $Z_1$ in block 808 to $Z_2$ in block 810.

Having Unloaded $d_2$ from $Z_1$, the first block is no longer in equilibrium because $Z_1$ can increase now beyond its maximum. $Z_1$ and $d_1$ were left at the relational functional levels they were from the first step (before $d_2$ was loaded onto $Z_1$). Upon Re-Loading $d_2$ onto $Z_2$, the maximum of $F_1$ is recomputed, and hence referred to as $Z_1^{}$. Next the method checks whether $d_2$ gates $Z_1^{}$. Note that $d_2$ got unloaded from $Z_1$ and loaded onto $Z_2$. During this operation, $d_2$ was increased to a new level because of the gating effect it had on $Z_2$. The question to be answered is whether—at the new level of $d_2$ as determined by $Z_2$—does $d_2$ continue to restrict or gate $Z_1^{}$. If $d_2$ does not restrict $Z_1^{}$ (i.e., NO), then the method moves on to Re-Load the next Z element (i.e., $Z_2$). In this very simple example, the problem would be done because $Z_2$ is already in equilibrium. If $d_2$ does restrict $Z_1^{**}$ (i.e., YES), then two possibilities emerge: (1) If $Z_2$ has been Re-Loaded (which again does not fit for this simple example), then "Merge" $Z_1$ and $Z_2$, along with their components $d_1$, $d_2$, and $d_3$. (2) If $Z_2$ has not been Re-Loaded, then Re-Load $Z_2$ (i.e., the operation is recursive). Once the graph has been fully reduced in this manner, then each block is a function of a single variable, and the maximum for each block can be computed.

Merging takes and restores part (or all) of the original relationships in the graph, if it is found that they can not be broken down into simpler blocks. An example of a merged block is shown by 814 in FIG. 8. For instance, it is found that $Z_1$ is still gated by $d_2$, even though $Z_2$ has already lifted $d_2$ up to a new level. However, $Z_2$ has already been reloaded (and it is in some kind of Equilibrium). Accordingly, $Z_1$ and $Z_2$ are merged into the new family as shown in block 814. Given the simplicity of the present example, this merger resembles the original graph. However, the merged block turns out to be a function of a single variable (i.e., $Z_1$), which makes its maximization straightforward over prior art examples. $Z_1$ and $Z_2$ are no longer independent, but are functionally related by the fact that they intersect at $d_2$. Accordingly, $Z_1$ and $Z_2$ are functionally related via the appropriate function "h", and as indicated by relational arrow 816, and function 816'. Further detail is shown by:

$$z_1 = h_1(d_2) \qquad (15)$$

wherein $Z_1$ is functionally related to $d_2$ via function $h_1$. As further shown by:

$$z_2 = h_2(d_2) \Rightarrow d_2 = h_2^{-1}(z_2) \qquad (16)$$

$Z_2$ is functionally related to $d_2$ via function $h_2$. Hence, $Z_1$ can be rewritten as a function of $Z_2$ as shown by:

$$z_1 = h_1(h_2^{-1}(z_2)). \qquad (17)$$

Once the EVF representing the block has been rewritten using such relational substitutions, then one variable Z can be used to functionally represent the Merged block, and a maximum can be readily found in solving over this one variable.

Figure 9:
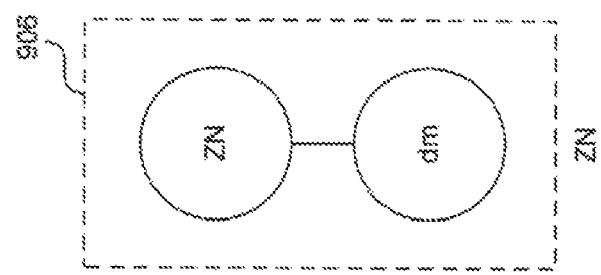
FIG. 9 shows a more complex plan which results in a plurality of blocks after the Loading and Reloading steps are used to produce an Equilibrium Configuration, with each block being maximized over a single variable.
Figure 9:
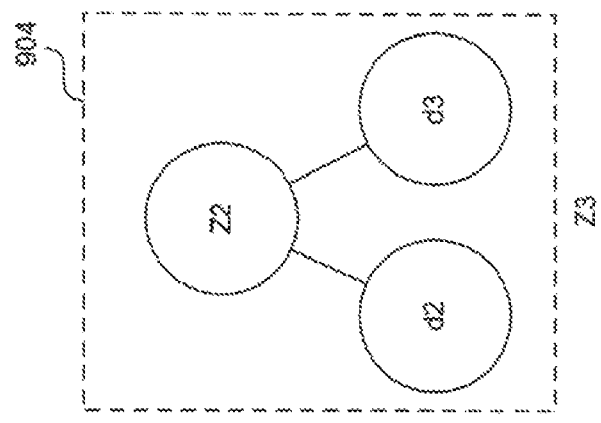
Figure 9:
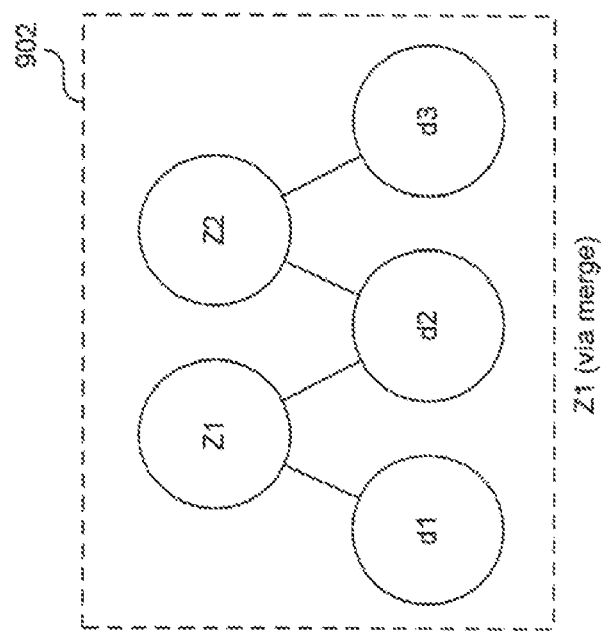

Sometime large families of elements might be found to merge into a relatively large sub-graph. In fact, a whole system might be found to merge back into one large block, as shown by the simple example of the present description. Still other examples might produce a large number of smaller blocks with no mergers resulting therefrom. Referring now to FIG. 9, a resulting balanced Equilibrium Configuration is shown for a large system with Z elements ranging from $Z_1$ through $Z_N$, and d components ranging from $d_1$ through $d_m$. A first block 902 is shown resulting from a merger of elements $Z_1$ and $Z_2$. The resulting EV function can be described in terms of the single variable $Z_1$. A second block 904 is shown with $Z_3$ loaded with both components $d_4$ and $d_5$. The resulting EV function would be a function of the single variable $Z_3$. The blocks would continue per the above presented solution method, wherein block 906 shows element $Z_N$ loaded with component $d_m$, with the resulting EV function being a function of the single variable $Z_N$. Each of these EV functions can be maximized, and the resulting components $d_1$ through $d_m$ can be "backed out" of the transformed variables Z (i.e., $d_1$ through $d_m$ can be solved for via inverse transformations). It is these levels of components $d_1$ through $d_m$ that will support the optimal levels of production of the products, which exist in the product space $X_1$ through $X_N$.

Flowcharts of Methodology

Figure 10:
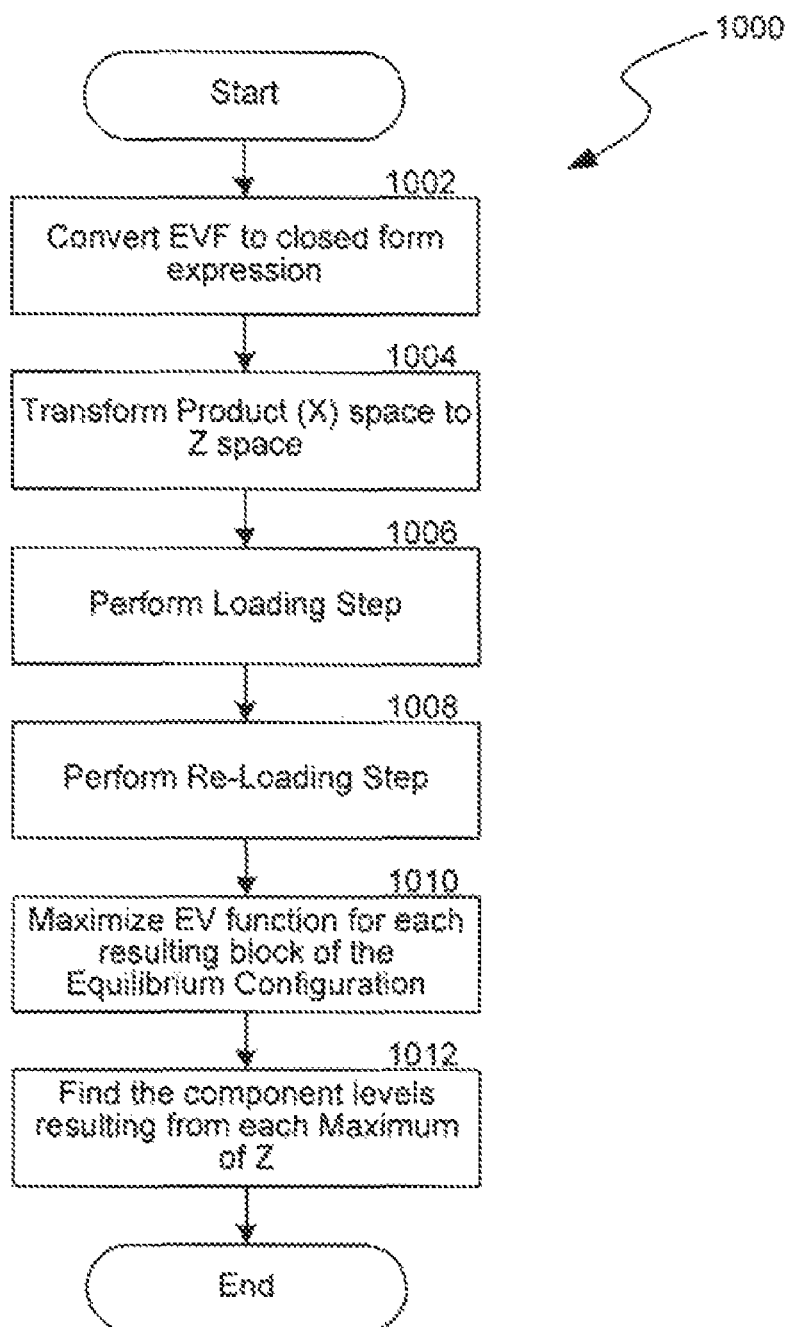
FIG. 10 shows a flowchart of certain representative steps that might be used to applied the optimization method, including the Loading and Re-Loading Steps.

The method described above can similarly be represented in the form of flowcharts to describe the process steps. Referring now to FIG. 10, a flowchart 1000 is shown of certain representative process steps used to find an optimum solution for an EV function. In step 1002, the EVF is converted to a closed form expression as per the apparatus and method described in the '560 application. A linear transformation, i.e., inverse Cholesky or the like, is applied in step 1004 to convert the X-space of the products to the Z-space required for the optimization solution. The Loading step is applied via step 1006, to recursively determine blocks of elements Z, as gated by the various components d. In step 1008, the Re-Loading step is performed to properly account for any Unloaded components, and to thereafter Merge various elements together into a single block is necessary. After the Loading and Re-Loading steps, the resulting configuration will be in equilibrium, and is hence referred to as an Equilibrium Configuration. In step 1010, the EV function resulting from each block of the Equilibrium Configuration are maximized, with a level Z resulting from each maximization. In step 1012, the component levels (i.e., values of d) can be computed from the resulting values of Z, via "backing out" each set of d components from each Z element through inverse transforms. The resulting levels of d will thereby be capable of producing enough products X to maximize the associated EVF for the system or plan.

Figure 11:
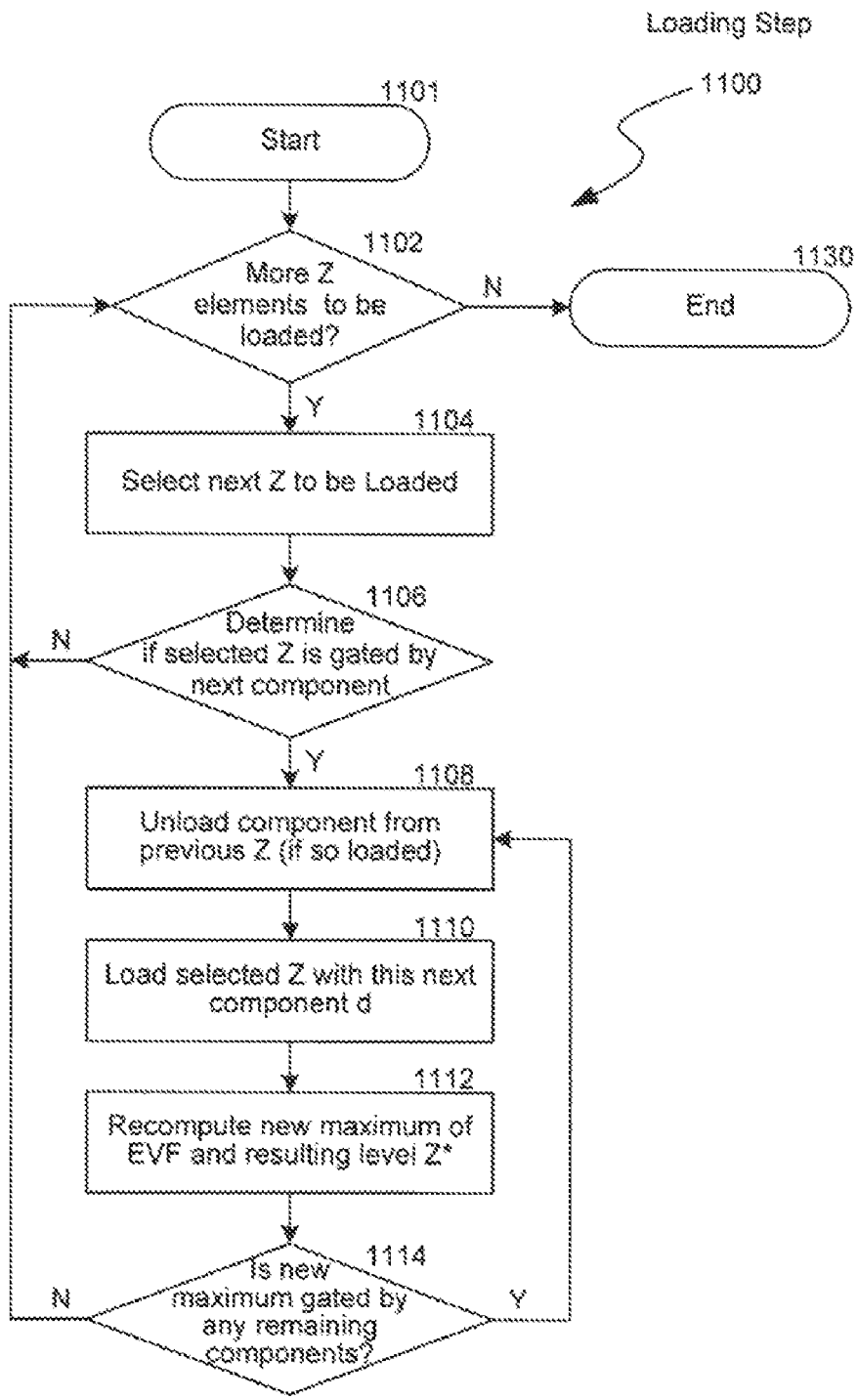
FIG. 11 shows a flowchart of certain representative steps that might be used to perform the Loading Step, shown as an element in FIG. 10.

Referring now to FIG. 11, the aforementioned Loading step (1006) is described in further detail via the representative steps shown in flowchart 1100. As described above in graphical terms, the transformed X-space consists of elements $Z_1$ through $Z_N$ which comprise an overall system or plan. The method starts its recursive routine at the start terminator 1101. In the first step, decisional block 1102 inquires whether there are any more Z elements to be loaded. If no more Z elements exists, then the loading step is finished and is routed to the end terminator 1130. Otherwise, if more elements exist, then step 1104 is used to select that next element Z to be loaded. As such, the method will initially start at Z and move on through the remaining Z elements in the particular system or plan.

Decisional block 1106 next determines if the selected Z element is gated by the next component d, in the series of components. The method will start with component $d_1$ and move on through the remaining d elements associated with the plan. If the Z element is not gated by the next component (i.e., NO), then the method is routed back to step 1102 to inquire whether any more Z elements remain to be loaded. Otherwise if the Z element is gated by this next component (i.e., YES), then step 1108 shows the necessity for Unloading that component from the Previous Z element, if that component was so Loaded. Step 1110 shows the selected Z (from step 1104) being loaded with the d component. Step 1112 next shows the process of recomputing the new maximum of the loaded EVF, which results in a new maximum level $Z^*$.

Decisional block 1114 next inquires whether the new maximum $Z^*$ is gated by any remaining components in the plan. If the new maximum is so gated (i.e., YES), then the method is routed back up to step 1108 so that the particular component can be unloaded from the previous Z (if so loaded). Step 1110 then loads this next component onto Z, and a new maximum is recomputed for the resulting EVF. This process loop repeats itself until the new maximum is not longer gated by any further remaining components (i.e., NO results from decisional block 1114. The process is thereafter routed back up to step 1102 to move onto the next Z element, if more Z elements exist to be loaded.

Figure 12:
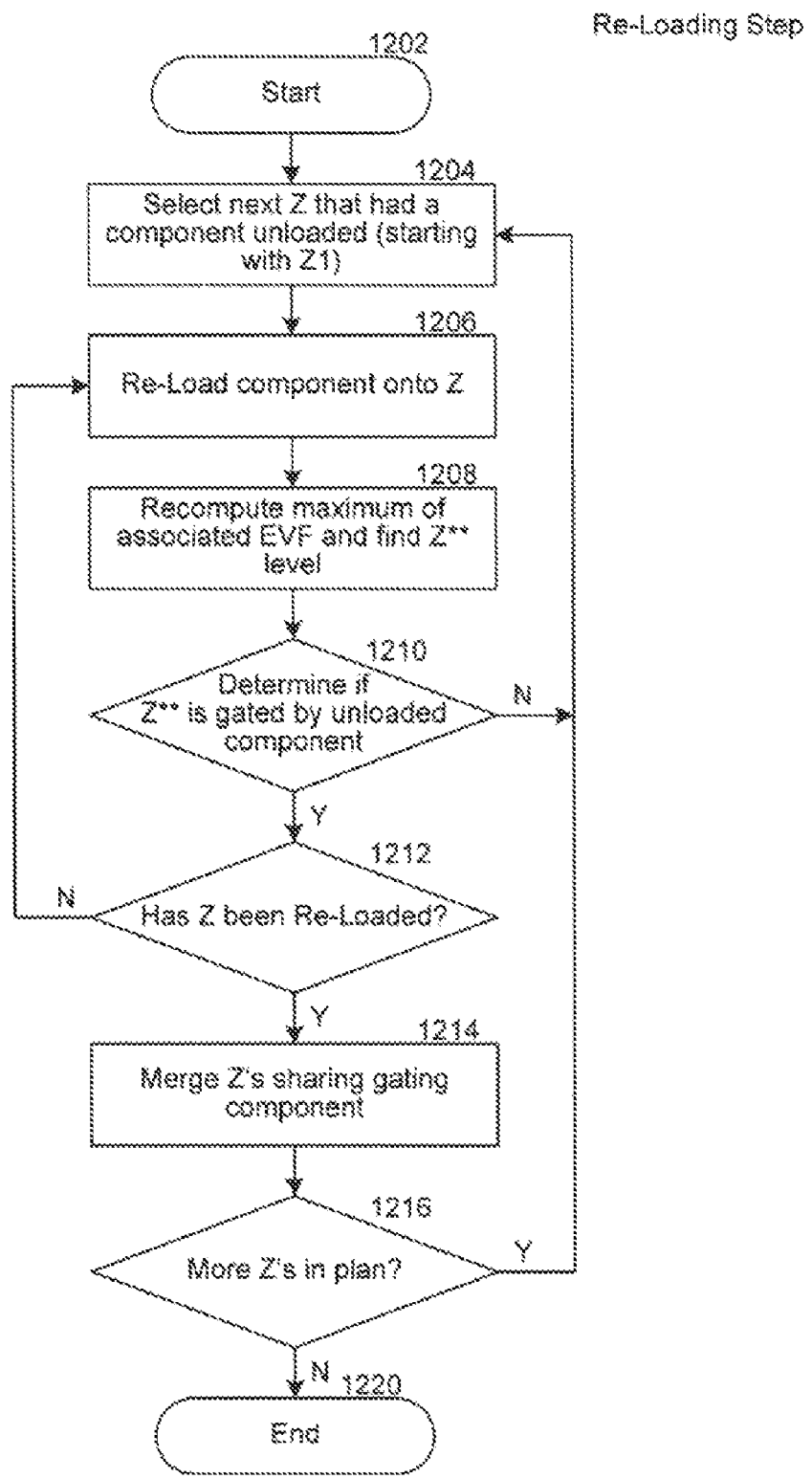
FIG. 12 shows a flowchart of certain representative steps that might be used to perform the Re-Loading Step, shown as an element in FIG. 10.

Once the Loading Step is completed (element 1006, FIG. 10), the Re-loading Step is performed (element 1008, FIG. 10). Referring now to FIG. 12, certain representative steps associated with the Re-Loading process are shown. The process begins at the Start terminator 1202. The Re-Loading step is essentially going to address Z elements that had a particular component unloaded via the methodology described in the Loading Step above. The process will recursively cycle through all of the relevant Z elements, to make sure that each one is Re-Loaded, as necessary. Step 1204 shows the step of selecting the next Z that had a component unloaded from the Loading Step, starting with $Z_1$. Step 1206 shows that component being Re-Loaded onto the selected Z element. In step 1208, the maximum of the associated EVF is recomputed to find the level Z. In decisional block 1210, it is next determined whether the newly maximized Z is gated by the particular component.

If this Z is not so gated (i.e., NO), then control is routed back up to step 1204, to select the next Z element. If Z is so gated (i.e., YES), then two possibilities might occur. In decisional block 1212, an inquiry is made as to whether this Z element has been Re-Loaded. If Z has not been Re-Loaded (i.e., NO), then control is routed back to step 1206 wherein the Unloaded component is Re-Loaded onto component Z. The process then continues through the steps 1208 and 1210 as before. If Z has been Re-Loaded (i.e., YES results from decisional block 1212), then step 1214 next shows the step of Merging the particular Z's that share a gating component. As described above, Merging results in a larger graphical block, or subgraph, of the main system or plan, but which can still be maximized over a single variable Z associated with that block. Thereafter, a decisional block 1216 inquires whether there are more Z elements in the representative plan. If more Z elements exist (i.e., YES), then control is routed back up to step 1204, wherein the next Z element is selected that had a component Unloaded. This process recursively continues down through the aforementioned steps until there are no more Z elements associated with the plan, and control is routed to the End Terminator 1220 from decisional block 1216.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A computer-implemented method comprising:
   receiving a relationship between a output value and a plurality of variables, wherein the plurality of variables comprise:
      a set of refinement quantities, wherein each refinement quantity corresponds to one refinement among a plurality of refinements, and generation of each refinement among the plurality of refinements requires at least one corresponding resource among a plurality of resources;
   receiving statistical information regarding the refinement quantities;
   generating by a computer a transformation in response to the statistical information, wherein the transformation relates the set of refinement quantities to a set of transformed refinement quantities;
   for each transformed refinement quantity among the set of refinement quantities:
      identifying by the computer at least one gating resource, among the plurality of resources, that limits the transformed refinement quantity,
      in response to the identifying, constructing by the computer a single-variable relationship between a constituent of the output value and a single variable, wherein the constituent of the output value, the single-variable relationship, and the single variable correspond to the transformed refinement quantity, and
      optimizing by the computer the constituent of the output value based on the single-variable relationship; and
   generating by the computer output data based on the optimizing the constituents of the output value, wherein the output data is usable in optimizing the output value.

2. The method of claim 1, wherein:
   the refinements comprise at least one of: manufacturing products, financial assets, work tasks, energy products, or real estate products;
   the resources comprise at least one of: manufacturing components, liquid capital, manpower resources, energy resources, or real estate resources;
   the output value is an expected value of the refinements;
   the statistical information describes demand for the refinement quantities; and
   the output data comprises a set of prescribed refinement quantities for the plurality of refinements.

3. The method of claim 2, wherein the output data comprises a set of prescribed quantities of resources for the plurality of resources, and the optimizing the constituent of the output value comprises determining one or more of: (i) an optimal value of the constituent of the output value, or (ii) a value of the single variable that provides an optimization of the constituent of the output value.

4. The method of claim 1, wherein the relationship between the output value and the plurality of variables comprises a sum of products of univariate integrals, each with a closed form solution.

5. The method of claim 1, wherein the relationship between the output value and the plurality of variables comprises a sum of products of margin and demand for each refinement.

6. The method of claim 1, wherein the relationship between the output value and the plurality of variables comprises a function comprising terms dependent on the refinement quantities, and the statistical information comprises (i) estimates of demand for the refinement quantities and (ii) uncertainty in the demand for the refinement quantities.

7. The method of claim 1, wherein the relationship between the output value and the plurality of variables comprises a closed-form expression for an expected value function.

8. The method of claim 1, further comprising:
   generating, from the relationship between the output value and the plurality of variables, a closed-form expression for an expected value function.

9. The method of claim 1, wherein the statistical information comprises means and a covariance matrix that relate to the quantity of components, and the transformation relates to a transformation that changes the means to zero and that diagonalizes the covariance matrix.

10. An apparatus comprising:
   a circuit configured to receive a relationship between a output value and a plurality of variables, wherein the plurality of variables comprise:
      a set of refinement quantities, wherein each refinement quantity corresponds to one refinement among a plurality of refinements, and generation of each refinement among the plurality of refinements requires at least one corresponding resource among a plurality of resources;
   a circuit configured to receive statistical information regarding the refinement quantities;
   a circuit configured to generate a transformation in response to the statistical information, wherein the transformation relates the set of refinement quantities to a set of transformed refinement quantities;
   a circuit configured to, for each transformed refinement quantity among the set of refinement quantities:

identify at least one gating resource, among the plurality of resources, that limits the transformed refinement quantity, in response to identifying the at least one gating resource, construct a single-variable relationship between a constituent of the output value and a single variable, wherein the constituent of the output value, the single-variable relationship, and the single variable correspond to the transformed refinement quantity, and optimize the constituent of the output value based on the single-variable relationship; and a circuit configured to generate output data based on optimizing the constituents of the output value, wherein the output data is usable in optimizing the output value.

11. The apparatus of claim 10, wherein:

the refinements comprise at least one of: manufacturing products, financial assets, work tasks, energy products, or real estate products;

the resources comprise at least one of: manufacturing components, liquid capital, manpower resources, energy resources, or real estate resources;

the output value is an expected value of the refinements;

the statistical information describes demand for the refinement quantities; and the output data comprises a set of prescribed refinement quantities for the plurality of refinements.

12. The apparatus of claim 11, wherein the output data comprises a set of prescribed quantities of resources for the plurality of resources, and optimizing the constituent of the output value comprises determining one or more of: (i) an optimal value of the constituent of the output value, or (ii) a value of the single variable that provides an optimization of the constituent of the output value.

13. The apparatus of claim 10, wherein the relationship between the output value and the plurality of variables comprises a function comprising terms dependent on the refinement quantities, and the statistical information comprises (i) estimates of demand for the refinement quantities and (ii) uncertainty in the demand for the refinement quantities.

14. The apparatus of claim 10, wherein the statistical information comprises means and a covariance matrix that relate to the quantity of components, and the transformation relates to a transformation that changes the means to zero and that diagonalizes the covariance matrix.

15. An apparatus comprising:

means for receiving a relationship between a output value and a plurality of variables, wherein the plurality of variables comprise:

a set of refinement quantities, wherein each refinement quantity corresponds to one refinement among a plurality of refinements, and generation of each refinement among the plurality of refinements requires at least one corresponding resource among a plurality of resources;

means for receiving statistical information regarding the refinement quantities;

means for generating a transformation in response to the statistical information, wherein the transformation relates the set of refinement quantities to a set of transformed refinement quantities;

means for, for each transformed refinement quantity among the set of refinement quantities:

identifying at least one gating resource, among the plurality of resources, that limits the transformed refinement quantity, in response to the identifying, constructing a single-variable relationship between a constituent of the output value and a single variable, wherein the constituent of the output value, the single-variable relationship, and the single variable correspond to the transformed refinement quantity, and optimizing the constituent of the output value based on the single-variable relationship; and means for generating output data based on the optimizing the constituents of the output value, wherein the output data is usable in optimizing the output value.

* * * * *